United States Patent Office 3,580,966
Patented May 25, 1971

3,580,966
GRAFT COPOLYMERS OF ACRYLONITRILE ONTO A LINEAR POLYETHER HAVING QUATERNISED NITROGEN ATOMS
Helmut Engelhard, Leverkusen, Francis Bentz, Cologne, and Heinrich Rinkler and Günther Nischk, Dormagen, Germany, assignors to Farbenfabriken Bayer Aktiengesellschaft, Leverkusen, Germany
No Drawing. Filed Dec. 26, 1968, Ser. No. 787,222
Claims priority, application Germany, Jan. 4, 1968,
P 17 20 771.5
Int. Cl. C08f 29/56
U.S. Cl. 260—898       6 Claims

ABSTRACT OF THE DISCLOSURE

The invention relates to an acrylonitrile graft polymer having improved affinity for acid dyes comprising acrylonitrile being graft-polymerised together with other acrylic or vinyl monomers and a linear polyether having quaternised nitrogen atoms as graft base. The graft base has a molecular weight of about 1,000 to about 15,000 and the acrylonitrile graft polymer has a K-value (according to Fikentscher, Cellulose Chemie 13, (1932), page 58) of from 70 to 100. In the process of preparing said acrylonitrile graft polymer acrylonitrile and other copolymerisable comonomers are graft-polymerised in the presence of a graft base consisting of a linear polyether having quaternised nitrogen atoms.

---

This invention relates to acrylonitrile graft polymers having a high affinity for acid dyes, and to a process for their production by grafting acrylonitrile, optionally in conjunction with other copolymerisable compounds, on to linear polyethers containing quaternised nitrogen atoms.

As a rule, filaments and yarns produced from acrylonitrile homopolymers and from copolymers of acrylonitrile with neutral comonomers fall short of practical requirements in their affinity for dyes.

It is known that the affinity of acrylonitrile homopolymers and copolymers for acid dyes can be improved by copolymerising acrylonitrile with unsaturated amines, for example vinyl, isopropenyl pyridines, monovinyl alkyl ethers of amino alcohols, acrylic or methacrylic amides, or with acrylic or methacrylic acid glycidyl esters whose epoxy function is subsequently split by amines.

Although copolymers produced in this way are receptive to acid dyes, they frequently have low K-values so that the films and filaments produced from them lack sufficient strength and are only to a limited extent suitable for commercial application. In addition, the aforementioned copolymers discolour quite considerably under the effect of heat, both in solution and in solid form.

Graft polymers of acrylonitrile on prepolymers, such as nylon 6, for example, are also known.

The object of this invention are acrylonitrile graft polymers which contain at least 50% by weight of graft-polymerised acrylonitrile and optionally up to 10% by weight of another graft copolymerised comonomer from the group of acrylic and vinyl compounds and, as graft base, from 5 to 40% by weight of a linear polyether containing quaternised nitrogen atoms and corresponding to the general formula:

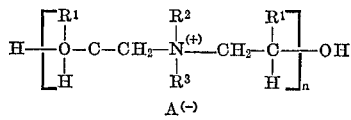

in which:

$R^1$ represents hydrogen or $(C_1\text{–}C_3)$alkyl,
$R^2$ represents $(C_1\text{–}C_6)$alkyl or cycloalkyl,
$R^3$ represents $(C_1\text{–}C_4)$alkyl, $(C_3$ or $C_4)$alkenyl, aralkyl or carboalkoxy alkyl, and
$A^{(-)}$ represents a halide anion or an anion of the formula:

or $CH_3\text{–}SO_4^{(-)}$ or $R_3$ and $A^{(-)}$ together repreesnt the group $\text{–}CH_2\text{–}CH_2\text{–}CH_2\text{–}SO_4^{(-)}$ or $\text{–}CH_2\text{–}CH_2\text{–}CH_2\text{–}CH_2\text{–}SO_4^{(-)}$ and $n$ represents a number from about 10 to about 80; the graft base having a molecular weight from about 1,000 to about 15,000 and the graft polymer having a K-value (according to Fikentscher, Cellulose Chemie 13 (1932), page 58) of from 70 to 100.

These polymers are thermally stable and highly receptive to acid dyes.

The present invention also provides a process for producing these acrylonitrile graft polymers, in which acrylonitrile, optionally in conjunction with up to 10% of one or more other copolymerisable monomers, is graft polymerised on to a linear polyether containing quaternised nitrogen atoms and having the general formula:

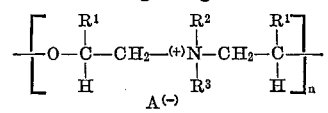

in which:

$R^1$ represents hydrogen or $(C_1$ to $C_3)$alkyl,
$R^2$ represents $(C_1$ to $C_6)$alkyl or cycloalkyl,
$R^3$ represents $(C_1$ to $C_4)$alkyl, $(C_3$ or $C_4)$alkenyl, aralkyl or carboalkoxy alkyl, and
$A^{(-)}$ represents a halide anion or an anion of the formula:

or $CH_3SO_4^{(-)}$, or $R^3$ and $A^{(-)}$ together represent the group $\text{–}(CH_2)_3\text{–}SO_4^{(-)}$ or $(CH_2)_4\text{–}SO_4^{(-)}$, and
$n$ represents a number of from about 10 to about 80; in aqueous medium in the presence of a radical-forming catalyst at a temperature in the range from 0 to 90° C.

The basic polyethers used as graft base, having molecular weights in the range from about 1,000 to about 15,000, are prepared by known processes, for example by condensing diols containing tertiary nitrogen atoms, either on their own or, to a limited extent, with normal glycols in the presence of acid catalysts (e.g. $H_3PO_3$; $H_2SO_4$; or sulphonic acids) at elevated temperature (e.g. 150 to 280° C.). The production of these basic polyethers is described in detail in German Pat. 1,243,874 which was published on July 6, 1967. However, it is preferred not to add normal glycols in the preparation of the polyethers because this would reduce the amount of tertiary nitrogen per basic molecular unit so that more graft base would have to be used in order to provide a satisfactory affinity for dyes. Accordingly, it is of advantage to use basic polyethers containing at least one tertiary nitrogen atom per polyether unit. Quaternisation is then carried out with the conventional quaternising agents. If desired, the polyethers carrying terminal hydroxyl groups may be extended beforehand with chain extending agents, for example diisocyanates, dicarboxylic acids or functional derivatives thereof.

The diols containing tertiary nitrogen atoms are N-β-hydroxyalkylamines of the kind obtained, for example, by the addition of ethylene-, propylene-, butylene- or styrene oxide, or optionally mixtures of these alkylene oxides, to primary amines of the aliphatic series (e.g. methylamine, ethylamine, butylamine, isobutylamine, propylamine or allylamine), or of the cycloaliphatic series (e.g. cyclohexylamine).

The resulting polyethers containing tertiary nitrogen atoms are quaternised by the usual methods in alcohol or alcohol/water using conventional quaternising agents, for example dimethyl sulphate, methyl p-toluene sulphonate, propane sultone, benzyl chloride, ethyl chloroacetate or allyl chloride. Following removal of the alcohol in vacuo, the resulting salt-like compounds are dissolved in water and the resulting solutions are used for the graft polymerisation reaction.

A polyether with the following recurring structural unit is obtained, for example, following quaternisation of the polyether of N,N-di-β-hydroxyethyl-cyclohexylamine with dimethyl sulphate as the graft base:

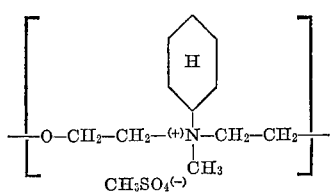

whilst a polyether with the following recurring structural unit is obtained following quaternisation of the polyether of N,N-di-β-hydroxypropylmethyl amine with methyl paratoluene

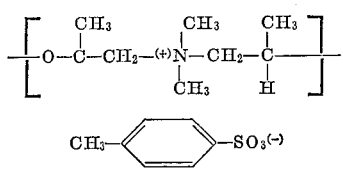

It has proved to be of advantage to use polyether salts containing at least one quaternised nitrogen atom per ether function because it is possible in this way to guarantee a high level of affinity for dyes.

The acrylonitrile is preferably grafted on to the quaternized polyethers in the presence of other copolymerisable monomers, for example acrylic or methacrylic acid esters, vinyl acetate, vinyl chloride, vinylidene chloride or acrylic amides. In this way, it is possible in particular to influence the solubility of the polymers in addition to their dyeability. The contribution made by the graft base to the total weight of the reactants to be polymerised amounts to from 5 to 40% by weight, and preferably to from 10 to 20% by weight, based on the unquaternised polyethers.

The graft polymerisation reaction is carried out in the aqueous phase (it is also possible to work in 65% by weight nitric acid) with water-soluble radical-forming catalyst systems such as peroxides, azo compounds or redox systems based on peroxidic compounds and sulphur compounds in low oxidation states, for example potassium, sodium or ammonium persulphate, together with sulphur dioxide, alkali metal hydrosulphites, alkali metal pyrosulphites, alkali metal thiosulphates and β-diketo compounds. Examples include acetyl acetone, acetoacetanilide, barbituric acid or dibenzoyl methane. The catalyst is used in a quantity of from 0.5 to 5% by weight, based on the total weight of the polymerisation components. The ratio between oxidising agent and reducing agent is preferably from 1:0.5 to 1:10. The water is conveniently used in a quantity of from 5 to 15 times, and the nitric acid in a quantity of from 3 to 10 times. The aqueous-phase polymerisation reaction is carried out at a temperature in the range from 20 to 90° C. and preferably in the range from 40 to 70° C., whilst polymerisation in nitric acid is carried out at a temperature from −10 to +30° C. and preferably at a temperature from 0 to +5° C.

The aqueous-phase graft polymerisation reaction is carried out as follows: the pH-value is adjusted to a value from 1 to 7, the solution is heated to the desired temperature and the initiator system is added all at once to the monomer mixture introduced beforehand, or alternatively, is continuously added, together with some of the monomers, to the remainder of the reactants. The graft polymers which accumulate are separated off by filtration under suction, washed and dried. In this process, they are formed in high yields and have the K-values (according to Fikentscher, Cellulose Chemie 13 (1932) page 58) of from 70 to 100 required for commercial application.

The mixture of polymerisable components is dissolved in nitric acid, preferably together with an organic reducing agent, and polymerisation is initiated by adding an oxidising agent, at a temperature of from 0 to +5° C.

The graft polymers remain in solution so that, if desired, the solutions may either be directly spun or alternatively the polymer may be precipitated with water and further processed after the acid has been washed out, as already mentioned.

The films prepared from an approximately 15% by weight dimethyl formamide solution show a high affinity for the acid dye Azilandirektblau A (Colour Index vol. I, page 1264). The polymer in solution in dimethyl formamide undergoes little or no discolouration under the influence of heat and can be spun.

Its affinity for dyes is measured by the following methods:

To assess dyeability, a thin film (250 to 500μ) covering a glass plate is prepared from an approximately 15 to 20% by weight solution of the polymer in dimethyl formamide. The film is dried for 5 hours at 50 to 60° C., removed from the glass plate and then boiled for 1 hour in water in order to remove any dimethyl formamide entrained in it. The film is then boiled for 1½ hours in 100 parts by volume of the dye solution (1 part by weight of Azilandirektblau A and 8 parts by volume of 10% by weight sulphuric acid, dissolved in 1000 parts by volume of water) and finally is boiled for another hour in distilled water.

The dried, dyed film is dissolved in 1000 parts by volume of dimethyl formamide, and the extinction value of this solution is measured at 20° C. at the wavelength indicated.

The results of this measurement are expressed as extinction per g. of film.

The following examples illustrate more particularly the invention.

In the examples, parts by weight are to parts by volume as kg. to litres.

EXAMPLE 1

14 parts by weight of the polyether:

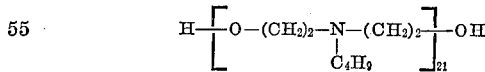

with an average molecular weight of 3000 are taken up in 50 parts by volume of methanol, followed by the addition of 21 parts by weight of methyl p-toluene sulphonate. The mixture is boiled under reflux for 30 minutes and then concentrated to form a syrup which is dissolved in 930 parts by volume of water adjusted to a pH-value of 4. 52.5 parts by weight of acrylonitrile and 3.5 parts by weight of methyl acrylate are added, and polymerisation is initiated with stirring at 50° C. in the presence of nitrogen, using 0.7 part by weight of potassium persulphate and 0.7 part by weight of sodium bisulphite. After a reaction time of 16 hours, the polymer is suction filtered, washed thoroughly and dried in a vacuum drying cabinet at 50 to 60° C.

Yield: 65 parts by weight (73.3% of the theoretical). The polymer has a K-value of 78 [according to Fikentscher, Cellulose Chemie 13, 58, (1932)].

EXAMPLE 2

14 parts by weight of the polyether:

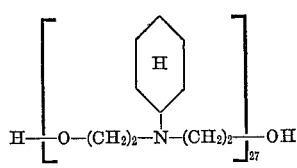

with an average molecular weight of about 4600 are suspended in 50 parts by volume of methanol, and the resulting suspension is heated under reflux for 30 minutes with 12 parts by volume of dimethyl sulphate. The reaction mixture is then concentrated to form a syrup which is dissolved in 930 parts by volume of water, and the pH-value is adjusted to 4.

3.5 parts by weight of methyl acrylate and 52.5 parts by weight of acrylonitrile are added to this solution, and polymerisation is initiated at 50° C. in the presence of nitrogen with 0.7 part by weight of potassium persulphate and 0.7 part by weight of sodium bisulphite. After 18 hours, the reaction product is worked up as in Example 1.

Yield: 57 parts by weight (71% of the theoretical). The graft polymer has a K-value of 81.

EXAMPLE 3

14 parts by weight of the polyether:

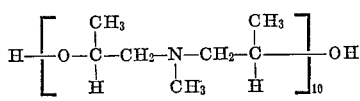

with an average molecular weight of about 1300, in solution in 100 parts by volume of methanol, are boiled under reflux for 30 minutes with 12 parts by volume of dimethyl sulphate, followed by removal of the solvent. The residue is dissolved in 930 parts by volume of water, the pH-value is adjusted to between 4 and 5, 52.5 parts by weight of acrylonitrile and 3.5 parts by weight of methyl acrylate are added and polymerisation is initiated at 50° C. with 0.7 part by weight of potassium persulphate and 0.7 part by weight of sodium bisulphite. The reaction time is 5½ hours.

After the reaction product has been worked up as described in Example 1, 57.5 parts by weight (68.5% of the theoretical) of a graft polymer of K-value 87 are isolated.

EXAMPLE 4

14 parts by weight of the same polyether as in Example 3 are quaternised by being boiled under reflux for 16 hours in 20 parts by volume of ethanol with 20 parts by weight of ethyl monochloroacetate. After the solvent has been evaporated in vacuo, the residue is dissolved in 930 parts by volume of water, 52.5 parts by weight of acrylonitrile and 3.5 parts by weight of methylacrylate are added and polymerisation is initiated at pH 2/50° C. with 0.7 part by weight of potassium persulphate and 0.7 part by weight of sodium bisulphate. Polymerisation is continued for 5 hours, after which the graft polymer is suction filtered, washed out and dried.

Yield: 43 parts by weight (51% of the theoretical). The graft polymer has a K-value of 77.

Dyeability (films) with Azilandirektblau A (590µ)

| Comparison: | Extinction/weighted portion of film (g.⁻¹) |
|---|---|
| Polyacrylonitrile containing 2.2% by weight of 2-vinylpyridine | 13.2 |
| Polyacrylonitrile containing 4.65% by weight of 2-vinylpyridine | 22.3–22.9 |
| Graft polymer of Example 2 | 23.1–24.0 |
| Graft polymer of Example 3 | 16.7–17.1 |

EXAMPLE 5

14 parts by weight of the following polyether:

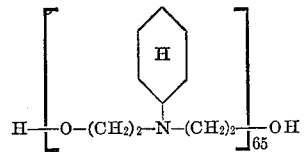

with an average molecular weight of around 11,000 are quaternised by being boiled for 30 minutes in 50 parts by volume of methanol with 12 parts by volume of dimethyl sulphate and 2 parts by volume of water, and dissolved in 930 parts by volume of water following evaporation of the solvent. The pH-value of the solution is adjusted with soda to 6, 3.5 parts by weight of methyl acrylate and 52.5 parts by weight of acrylonitrile are introduced and polymerisation is initiated with stirring at 50° C. in the presence of nitrogen with 0.7 part by weight of potassium persulphate and 0.7 part by weight of sodium bisulphite. Polymerisation is continued for 9 hours at 50° C. and for another 12 hours at room temperature.

The polymer is suction filtered, washed out and dried. Yield: 60 parts by weight (74.7% of the theoretical). The graft polymer has a K-value of 81.

Dyeability (film with azilandirektblau A: 578 mµ)

$$40.1-41 \frac{\text{extinction}}{\text{weighed portion of film}} (\text{g.}^{-1})$$

EXAMPLE 6

7 parts by weight of the polyester:

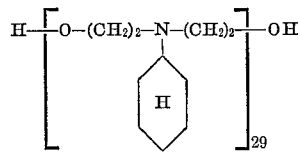

with an average molecular weight of 4900 are quaternised over 40 minutes with 6 parts by volume of dimethyl sulphate in 20 parts by volume of boiling methanol. The alcohol is subsequently evaporated in vacuo, the residue is dissolved in 930 parts by volume of water and the pH-value of the resulting seolution is adjusted to 6 with soda at 55° C. Following the addition of 59.5 parts by weight of acrylonitrile and 3.5 parts by weight of methyl acrylate, polymerisation is initiated with 0.7 part by weight of potassium persulphate, 0.7 part by weight of sodium bisulphite and 0.01 part by weight of FeSO₄. Polymerization is continued for 15 hours at 55° C. 64 parts by weight of dried graft polymer (81.5% of the theoretical) with a K-value of 80 are obtained.

Dyeability (film, azilandirektblau A: 578 mµ)

$$23.5-24.5 \frac{\text{Extinction}}{\text{Weighed portion of film}} (\text{g.}^{-1})$$

EXAMPLE 7

14 parts by weight of the polyether of Example 2 are boiled under reflux for 1 hour with 12 parts by volume of dimethyl sulphate in 50 parts by volume of methanol. The product is then concentrated in vacuo to form a syrup which is dissolved in 300 parts by volume of 65% by weight commercial nitric acid, and cooled to a temperature from 0 to 5° C. 52 parts by weight of acrylonitrile, 3.5 parts by weight of methyl acrylate, 0.05 part by weght of Fe(NO₃)₃·9H₂O, dissolved in 2 parts by volume of water, and 0.3 part by volume of acetyl acetone are added and polymerisation is initiated with 1.5 parts by weight of ammonium persulphate in 5 parts by volume of water. The reaction time is 17.5 hours at 0 to 5° C. A highly viscous milky solution is obtained which is poured in the form of a thin jet into 10 to 15 times the quantity of water, the polymer being precipitated in the form of filaments. The water is repeatedly changed until a neutral reaction is obtained and the polymer is mechanically size reduced, washed thoroughly again and dried.

Yield: 58 parts by weight (72% of the theoretical). The graft polymer has a K-value of 82.

Dyeability (film azilandirektblau A: 578 mμ)

$$23.6-24.1 \frac{\text{Extinction}}{\text{Weighed portion of film}} (\text{g.}^{-1})$$

What we claim is:

1. An acrylonitrile graft polymer comprising at least 50% by weight of acrylonitrile being graft-polymerised and up to 10% by weight of one or more comonomers being graft-copolymerised from the group consisting of an acrylic and vinyl compound and, as a graft base, from 5 to 40% by weight of a linear polyether having quarternised nitrogen atoms and the general formula

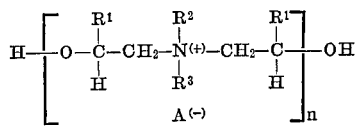

wherein $R^1$ represents hydrogen or ($C_1$ to $C_3$)alkyl, $R^2$ represents ($C_1$ to $C_6$)alkyl or cycloalkyl, $R^3$ represents ($C_1$ to $C_4$)alkyl, ($C_3$ or $C_4$)alkenyl, aralkyl or carboalkoxyalkyl and $A^{(-)}$ represents a halide anion or an anion of the formula

or $CH_3-SO_4^{(-)}$ or $R^3$ and $A^{(-)}$ together represents the groups $-CH_2-CH_2-CH_2-SO_4^{(-)}$ or $$CH_2-CH_2-CH_2-CH_2-SO_4^{(-)}$$

and $n$ represents a number from about 10 to about 80, said graft base having a molecular weight of about 1,000 to about 15,000 and said acrylonitrile graft polymer having a K-value (according to Fikentscher, Cellulose Chemie 13 (1932), page 58) of from 70 to 100.

2. A process for producing acrylonitrile graft polymers containing at least 50% by weight of copolymerised acrylonitrile which comprises graft polymerising acrylonitrile together with up to 10% of one or more other copolymerisable monomers, on to a linear polyether containing quaternised nitrogen atoms, corresponding to the general formula

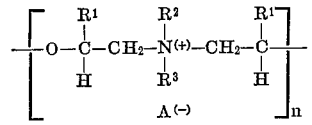

wherein $R^1$ represents hydrogen or ($C_1$ to $C_3$)alkyl, $R^2$ represents ($C_1$ to $C_6$) alkyl or cycloalkyl, $R^3$ represents ($C_1$ to $C_4$)alkyl, ($C_3$ or $C_4$)alkenyl, aralkyl or carboalkoxyalkyl, and $A^{(-)}$ represents a halide anion or an anion of the formula

or $CH_3SO_4^{(-)}$ or $R^3$ and $A^{(-)}$ together represents the group $-(CH_2)_3-SO_4^{(-)}$ or $-(CH_2)_4-SO_4^{(-)}$, and $n$ represents a number from about 10 to about 80, said graft polymerising being effected in an aqueous medium in the presence of a radical-forming catalyst at a temperature range from 0 to 90° C.

3. The process as claimed in claim 2, wherein said graft polymerising is carried out in the aqueous solution resulting from quaternisation of the graft substrate without isolating the graft substrate beforehand.

4. The process as claimed in claim 2, wherein said other copolymerisable monomer is methyl acrylate.

5. The process as claimed in claim 2, wherein the ratio of unquaternised graft base to the remaining polymerisable components is from 30:70 to 5:95.

6. The process as claimed in claim 2, wherein said graft polymerising is carried out in approximately 65% nitric acid in the presence of a Redox system.

References Cited
UNITED STATES PATENTS 2,941,969    6/1960    Price    260—29.6

MURRAY TILLMAN, Primary Examiner

R. J. SEIBERT, Assistant Examiner

U.S. Cl. X.R.

260—29.6, 32.6, 41, 899, 901

UNITED STATES PATENT OFFICE
CERTIFICATE OF CORRECTION

Patent No. 3,580,966      Dated May 25, 1971

Inventor(s) HELMUT ENGELHARD ET AL.

It is certified that error appears in the above-identified patent and that said Letters Patent are hereby corrected as shown below:

| Column | Line | Error |
|---|---|---|
| 2 | 26 formula | $"\left[ -O-\underset{H}{\overset{R^1}{C}}-CH_2-(+)\underset{R^3}{\overset{R^2}{N}}-CH_2-\overset{R^1}{C}- \right]_n"$ should be $---\left[ H-\!\!-O-\underset{H}{\overset{R1}{C}}-CH_2-\underset{R^3}{\overset{R^2}{N}}(+)CH_2-\overset{R^1}{C}- \right]_n OH$ $A(-)$ |
| 2 | 40 | $"CH_3SO_4(-)"$ should be $---CH_3-SO_4(-) ---$ |
| 2 | 41 | $"-(CH_2)_3-SO_4(-)$ or $(CH_2)_4-SO_4(-)"$ should be $--- -CH_2-CH_2-CH_2-SO_4(-)$ or $-CH_2-CH_2-CH_2-CH_2-SO_4(-) ---$ |
| 2 | 42 | after "80" insert (Spec.p2L 24 thru p 3 L25.) |

UNITED STATES PATENT OFFICE
CERTIFICATE OF CORRECTION

Patent No. 3,580,966　　　　　　　　　　Dated May 25, 1971

Inventor(s) HELMUT ENGELHARD ET AL.

It is certified that error appears in the above-identified patent and that said Letters Patent are hereby corrected as shown below:

| Column | Line | Error |
|--------|------|-------|
| 3 | 29 | after paratoluene insert ---sulphonate--- |
| 5 | 45 | "bisulphate" should be ---bisulphite--- |
| 5 | 68 | "weighted" should be ---weighed--- |

Signed and sealed this 7th day of December 1971.

(SEAL)
Attest:

EDWARD M. FLETCHER, JR.　　　　ROBERT GOTTSCHALK
Attesting Officer　　　　　　　　Acting Commissioner of Patents